(12) United States Patent
Pritchett

(10) Patent No.: US 7,699,728 B2
(45) Date of Patent: Apr. 20, 2010

(54) VARIABLE SPEED TRANSMISSION

(75) Inventor: Michael Pritchett, Waterford, MI (US)

(73) Assignee: Altair Engineering, Inc., Troy, MI (US)

( * ) Notice: Subject to any disclaimer, the term of this patent is extended or adjusted under 35 U.S.C. 154(b) by 1165 days.

(21) Appl. No.: 11/258,736

(22) Filed: Oct. 26, 2005

(65) Prior Publication Data

US 2007/0093324 A1 Apr. 26, 2007

(51) Int. Cl.
*F16H 55/56* (2006.01)
*F16H 59/06* (2006.01)

(52) U.S. Cl. .............................. 474/8; 474/23; 474/19; 474/37; 474/29; 474/31; 474/52; 474/53; 474/24; 474/35; 474/40; 474/13; 474/39

(58) Field of Classification Search ............... 474/23, 474/29, 37, 31, 52, 53, 24, 35, 40, 8, 13, 474/39, 19
See application file for complete search history.

(56) References Cited

U.S. PATENT DOCUMENTS

| | | | | | |
|---|---|---|---|---|---|
| 1,626,299 | A | * | 4/1927 | Reeves | 474/23 |
| 2,109,247 | A | * | 2/1938 | Clay | 57/94 |
| 2,454,991 | A | * | 11/1948 | Cooke | 474/29 |
| 2,577,913 | A | * | 12/1951 | Peterson | 474/29 |
| 2,711,103 | A | * | 6/1955 | Miner | 474/19 |
| 2,714,825 | A | * | 8/1955 | Lorenzo | 475/204 |
| 2,893,254 | A | * | 7/1959 | Grover | 474/23 |
| 3,234,806 | A | * | 2/1966 | Maurer et al. | 474/19 |
| 3,590,649 | A | * | 7/1971 | Fischer | 474/19 |
| 4,196,641 | A | * | 4/1980 | Vogel | 474/19 |
| 4,321,991 | A | * | 3/1982 | Teijido et al. | 477/39 |
| 4,585,429 | A | | 4/1986 | Marier | 474/12 |
| 5,720,681 | A | | 2/1998 | Benson | 474/10 |
| 6,120,399 | A | | 9/2000 | Okeson et al. | 474/14 |

(Continued)

*Primary Examiner*—Bradley T King
*Assistant Examiner*—Mahbubur Rashid
(74) *Attorney, Agent, or Firm*—Young Basile

(57) ABSTRACT

A variable speed transmission of the continuously variable type. The transmission includes an input pulley having primary and secondary sheaves and an output pulley having primary and secondary sheaves. The primary and secondary sheaves of the input pulley are mounted on a first axle shaft carried by an actuator plate and the primary and secondary sheaves of the output pulley are carried on a second axle shaft carried by the actuator plate. The input shaft of the transmission carries pin mounted roller bearings which are received in skewed slots in an actuator sleeve so that the actuator sleeve is moved axially along the input shaft in response to variations in torque loading. The actuator plate is annular and includes a central circumferential groove receiving pin mounted roller bearings carried by the actuator sleeve so that the actuator plate, and the axle shafts carried thereby, undergoes the same axial movement as the actuator sleeve in response to variations in torque loading. One sheave of each pulley is fixedly mounted on the respective axle shaft and the other sheave is slidably and rotatably mounted on the shaft. The mounting of the pulleys on the respective axle shafts is such that axial movement of the actuator plate has the effect of moving the sheaves of one pulley apart and simultaneously moving the sheaves of the other pulley together whereby to cause the entrained drive belt to move radially outwardly relative to the sheaves of one pulley while moving radially inwardly with respect to the sheaves of the other pulley whereby to change the drive ratio of the transmission.

7 Claims, 11 Drawing Sheets

U.S. PATENT DOCUMENTS

| | | | |
|---|---|---|---|
| 6,146,295 A * | 11/2000 | Mor et al. | 474/13 |
| 6,413,178 B1 | 7/2002 | Chamberland | 474/19 |
| 6,461,268 B1 | 10/2002 | Milner | 475/183 |
| 6,502,479 B1 | 1/2003 | Lee | 74/568 |
| 6,569,043 B2 | 5/2003 | Younggren et al. | 474/19 |
| 6,733,406 B2 | 5/2004 | Kitai et al. | 474/13 |
| 6,860,826 B1 * | 3/2005 | Johnson | 474/19 |
| 2003/0189305 A1 | 10/2003 | Mallard | 280/216 |

* cited by examiner

VARIABLE SPEED TRANSMISSION

BACKGROUND

This invention relates to variable speed transmissions and more particularly to transmissions of the continuously variable type.

A myriad of continuously variable transmissions have been proposed and/or utilized to deliver torque in a continuously variable manner between an input drive and an output drive. Whereas these prior art continuously variable transmissions have been generally satisfactory, the mechanisms for varying the drive ratio in response to variations in the input torque are sometimes relatively insensitive to relatively small changes in input torque and/or the changes in drive ratio in response to variations in input torque are sometimes not accomplished in a smooth, positive manner.

SUMMARY OF THE INVENTION

This invention relates to an improved continuously variable transmission.

More specifically this invention relates to a continuously variable transmission which is sensitive to relatively minor changes in input torque and which functions at all times in a positive and smooth manner.

The continuously variable transmission of the invention is of the type including first and second pulleys, each including relatively axially moveable primary and secondary sheaves, and a belt trained around each of the pulleys and operative to drive the output pulley from the input pulley at a ratio that is a function of the axial spacing between the sheaves of the respective pulleys.

According to an important feature of the invention, the first pulley is rotatable about a first axis of rotation and has a primary sheave and secondary sheave positioned adjacent the primary sheave; the primary sheave is moveable axially along the path of travel defined by the first axis of rotation; the second pulley is rotatable about a second axis of rotation parallel to the first axis of rotation and has a primary sheave and a secondary sheave positioned adjacent the primary sheave of the secondary pulley; the primary sheave of the second pulley is moveable along a path of travel defined by the second axis of rotation; the transmission further includes an actuator plate moveable along a path of travel substantially parallel to at least one of the first and second axes of rotation; the actuator plate is drivingly connected to the primary sheave of the first pulley and the primary sheave of the second pulley for concurrent axial movement therewith; and the actuator plate is moveable independently of the secondary sheave of the first pulley and the secondary sheave of the second pulley.

According to a further feature of the invention, the transmission further includes an axle shaft having an end connected to the actuator plate for concurrent axial movement with the actuator plate; the axle shaft is connected to the primary sheave of the first pulley for concurrent axial movement therewith in at least one direction; and the axle shaft is slidably engageable with a bore formed in the secondary sheave of the first pulley.

According to a further feature of the invention, the secondary sheave of the first pulley rotatably engages the axle shaft.

According to a further feature of the invention, the axial displacement of the actuator plate relative to at least one of the first and second pulleys causes a distance between the primary and secondary sheaves of the first pulley to increase while simultaneously causing a distance between the primary and secondary sheaves of the second pulley to decrease.

According to a further feature of the invention, the secondary sheave of the first pulley is disposed between the actuator plate and the primary sheave of the first pulley and the primary sheave of the second pulley is disposed between the actuator plate and the secondary sheave of the second pulley.

According to a further feature of the invention, the transmission further includes a frame structure including a first frame portion and a second frame portion axially spaced from the first frame portion; the secondary sheave of the first pulley is journaled in the first frame portion; and the secondary sheave of the second pulley is journaled in the second frame portion.

According to a further feature of the invention, the primary sheaves of the first and second pulleys each have an interior surface operably engageable with the driving belt and an opposite exterior surface; and the first and second primary sheaves are oriented relative to the actuator plate such that the interior surface of the first primary sheave and the exterior surface of the second primary sheave face the actuator plate and the exterior surface of the first primary sheave and the interior surface of the second primary sheave face away from the actuator plate.

According to a further feature of the invention, the path of travel of the actuator plate is parallel to and substantially equidistant between the first and second axes of rotation.

According to a further feature of the invention, the primary sheave of the first pulley is displaced a first predetermined distance from the actuator plate; the primary sheave of the second sheave is displaced a second predetermined distance from the actuator plate; and the first distance is greater than the second distance.

According to a further feature of the invention, the transmission further includes an actuator member rotatably connected to the actuator plate and fixed for concurrent axial movement therewith; the actuator member is positioned at a substantially constant predetermined distance from the primary sheave of the first pulley and the primary sheave of the second pulley; the transmission further includes an input shaft slidably and rotatably engageable with the actuator member; and the input shaft is positioned at a substantially constant predetermined distance from the secondary sheave of the first pulley and the secondary sheave of the second pulley.

According to a further feature of the invention, the actuating member includes a helical slot; the transmission further includes connecting means fixedly attached to the input shaft and engageable with the helical slot of the actuator member; and the parts are configured such that rotation of the input shaft relative to the actuator member causes a corresponding axial shift of the actuator member relative to the input shaft.

According to a further feature of the invention, the actuator member comprises an actuator sleeve positioned in slidable surrounding relation to the input shaft.

According to a further feature of the invention, the actuator plate includes an interior surface defining a circular opening for receiving the actuator member; the interior surface further defines a continuous uninterrupted groove extending circumferentially along an inner perimeter of the opening; and the transmission further comprises a plurality of circumferentially spaced pins mounted on the actuator member and received in the circumferential groove.

The invention also discloses a variable speed transmission including a pulley having a primary sheave and a secondary sheave positioned adjacent the primary sheaves, the primary and secondary sheaves independently rotatable about a common first axis of rotation and the primary sheave moveable axially relative to the secondary sheave along a path of travel defined by the first axis of rotation, and an actuator mechanism including an actuator member rotatable about a second axis of rotation and moveable axially relative to the secondary sheave along a path of travel defined by the second axis of rotation, the actuator member drivingly connected to the secondary sheave for concurrent rotation therewith at a constant relative speed ratio and to the primary sheave for concurrent axial translation therewith relative to the secondary sheave.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENTS

Figure 1:
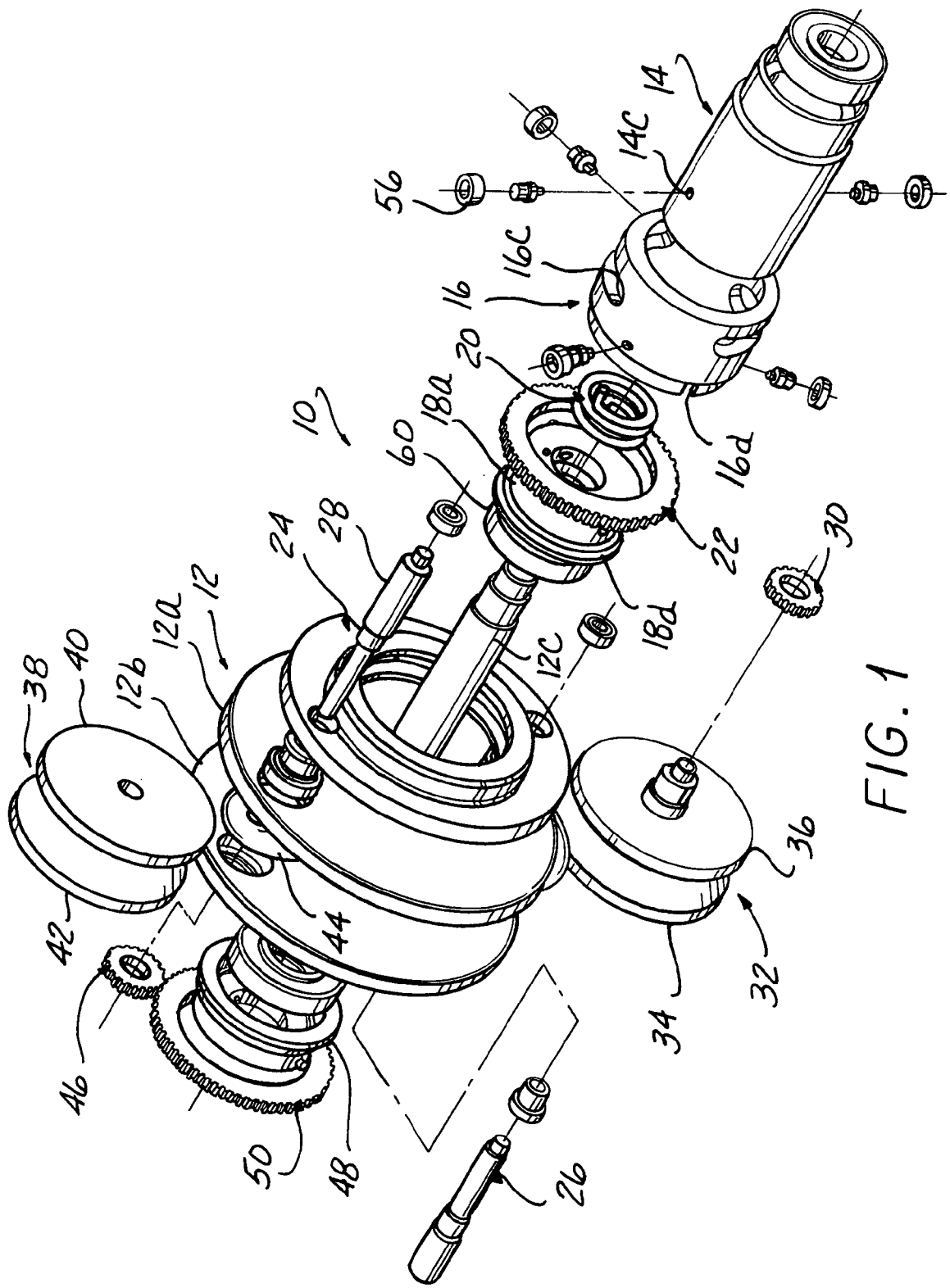
FIG. 1 is an exploded perspective view of a first embodiment of the invention variable speed transmission.
Figure 2:
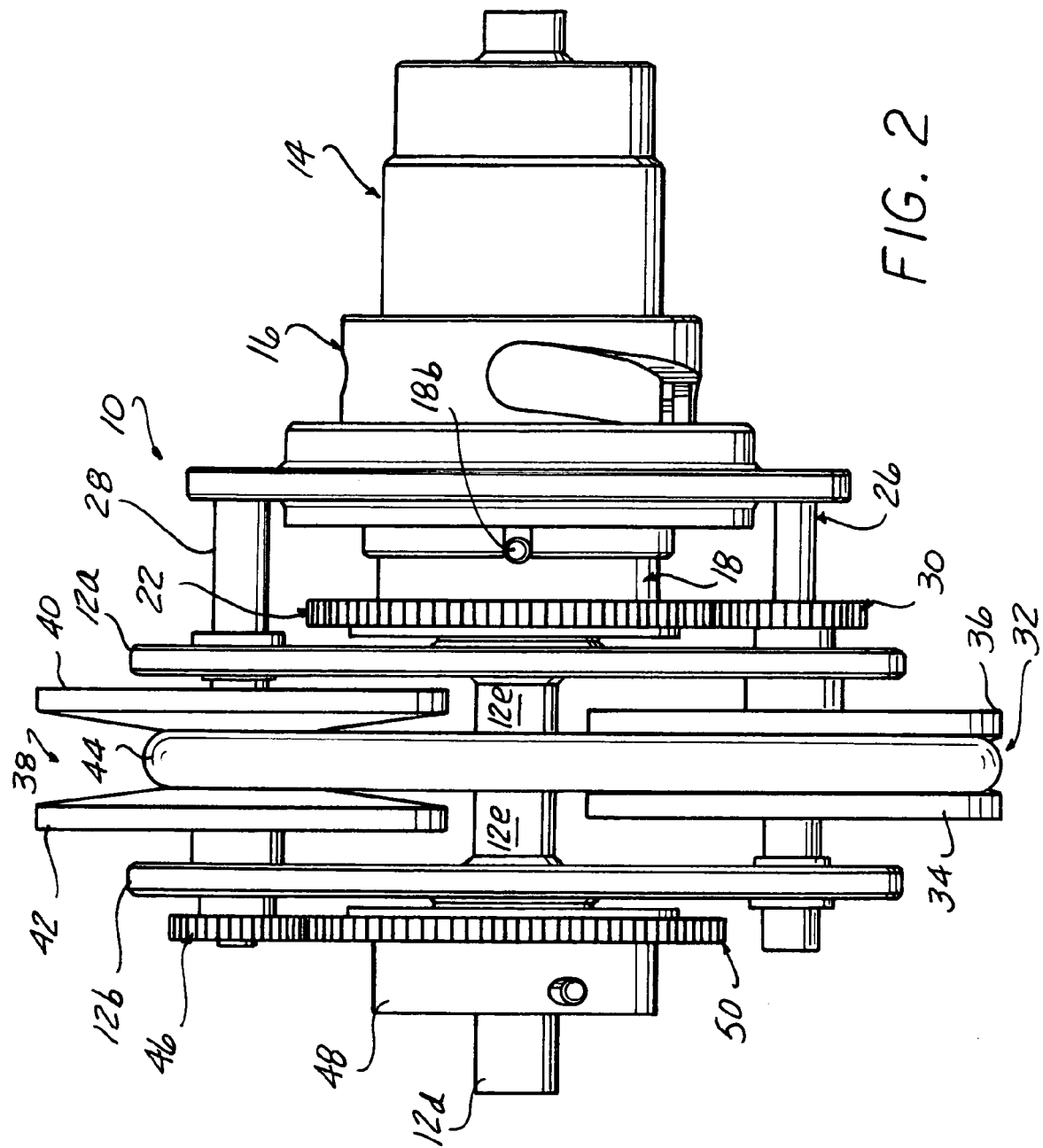
FIG. 2 is a side elevational view of the transmission of FIG. 1.
Figure 3:
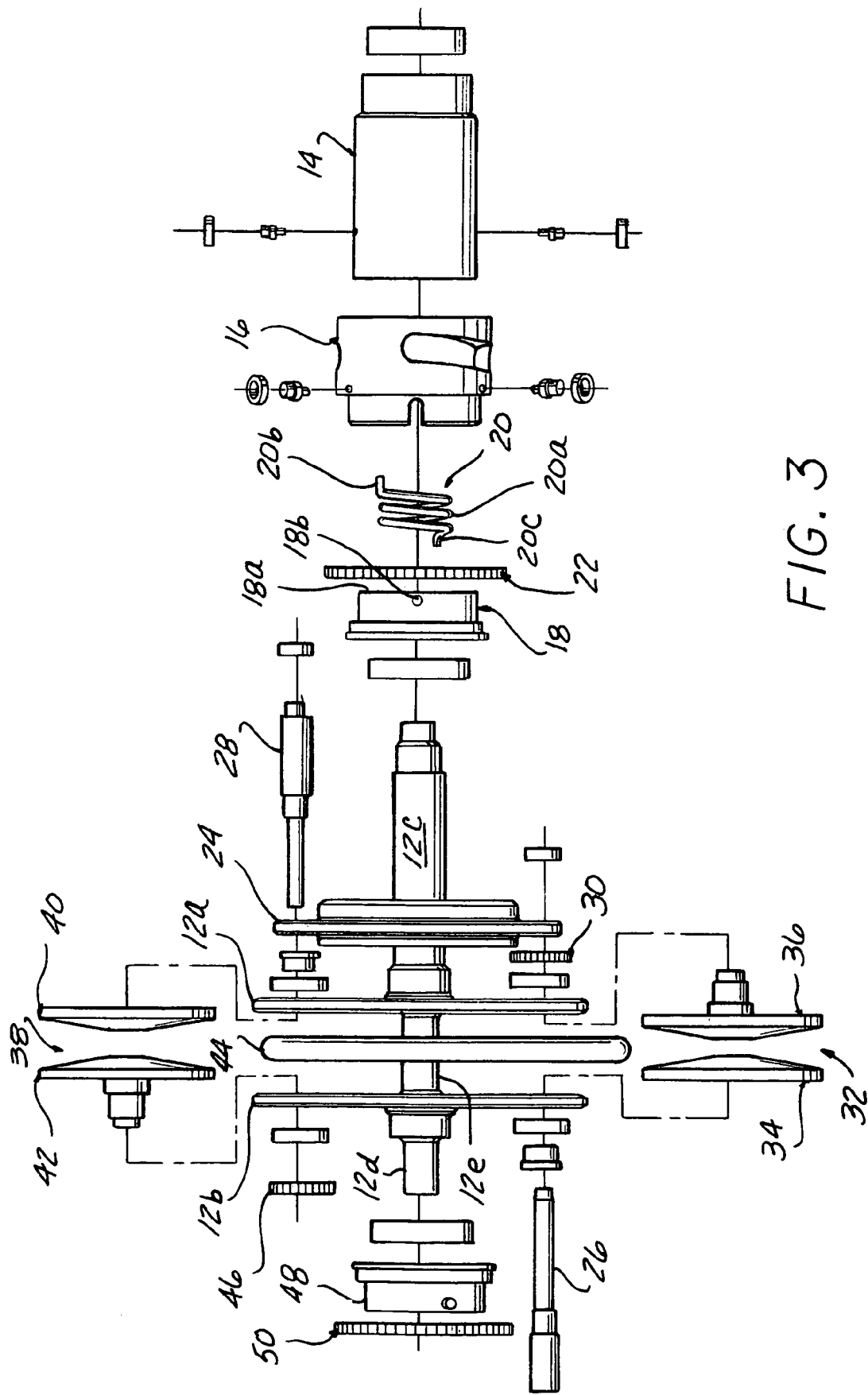
FIG. 3 is an exploded side elevational view of the transmission.
Figure 4:
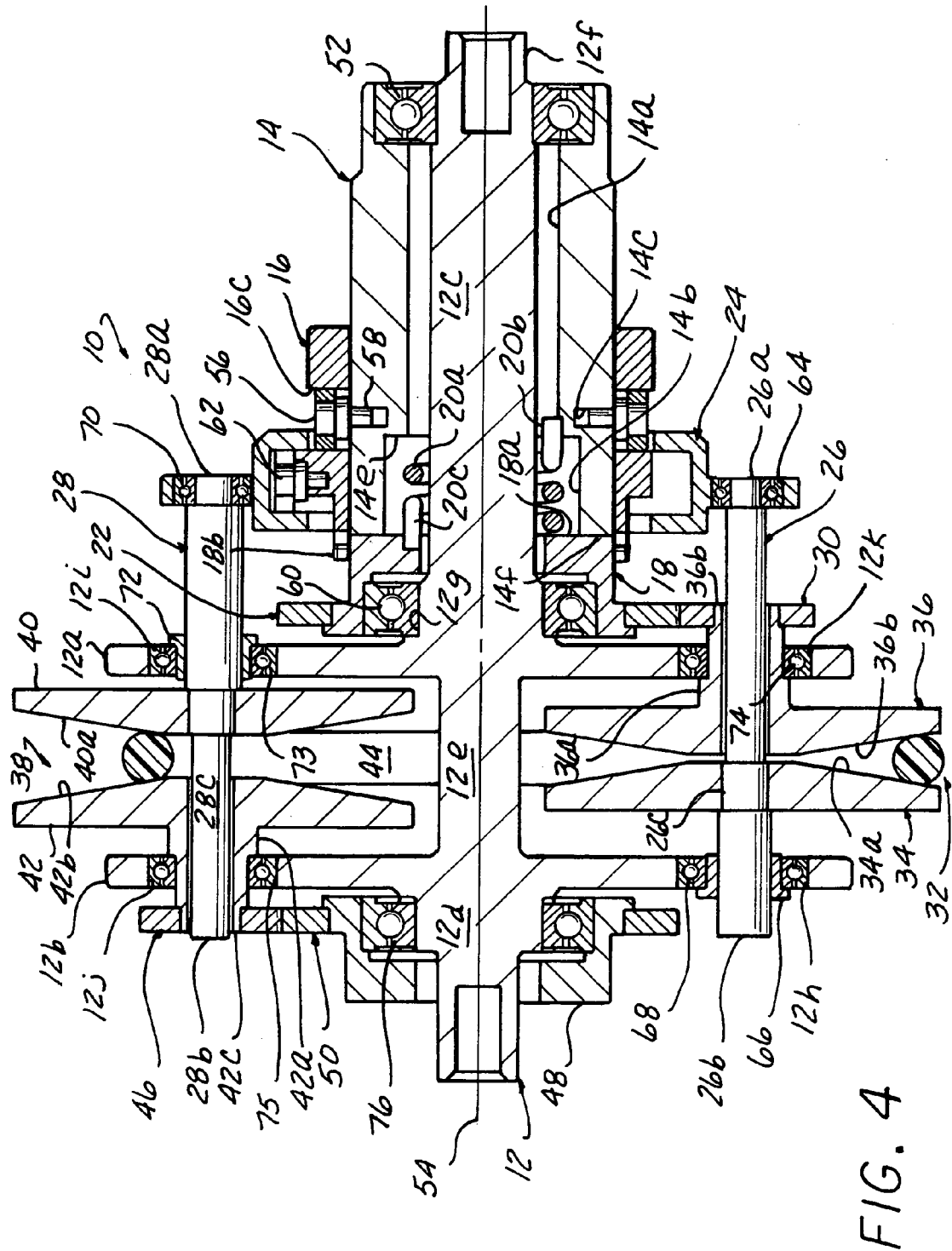
FIG. 4 is a cross-sectional view of the transmission.
Figure 5:
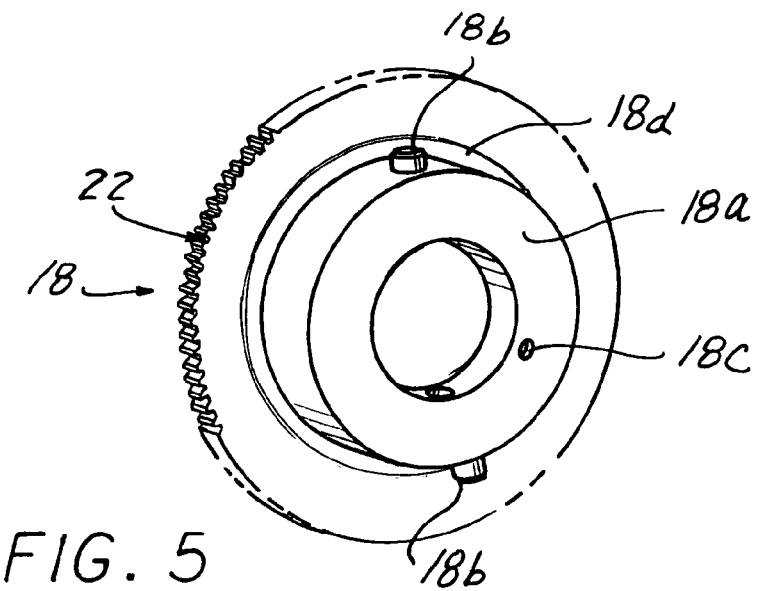
FIGS. 5-12 are detail views of various elements of the transmission.
Figure 6:
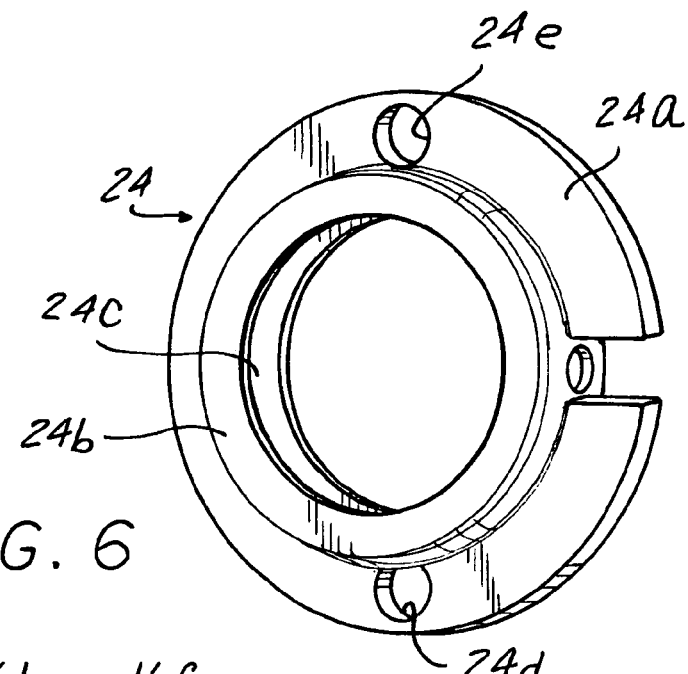
Figure 7:
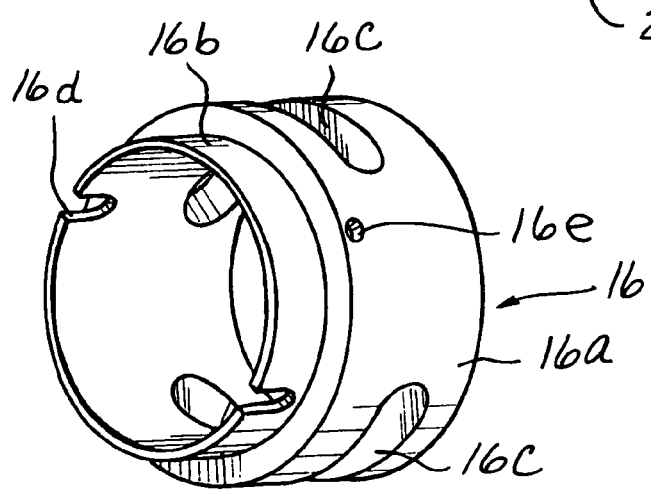
Figure 9:
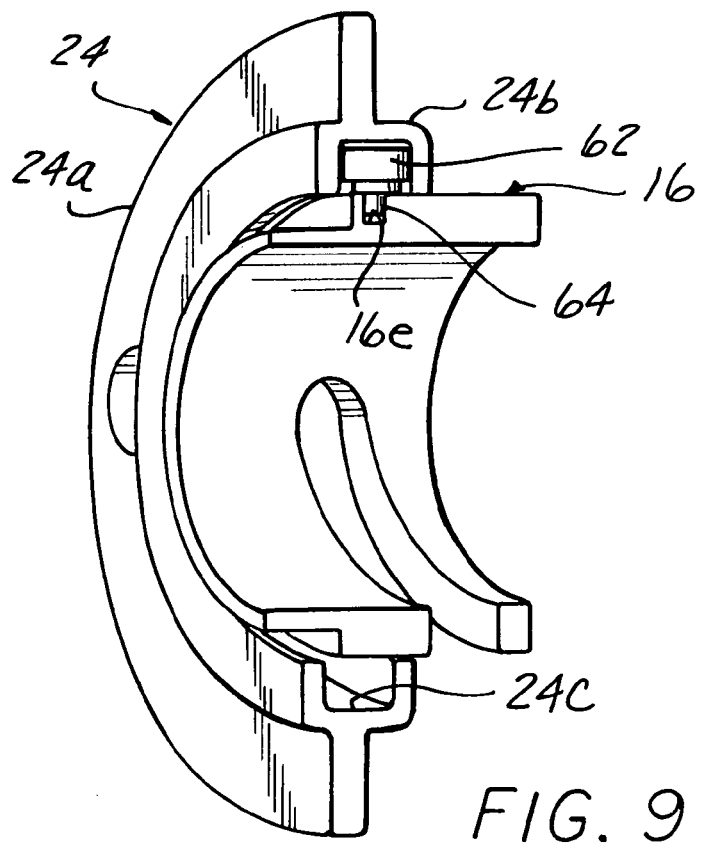
Figure 8:
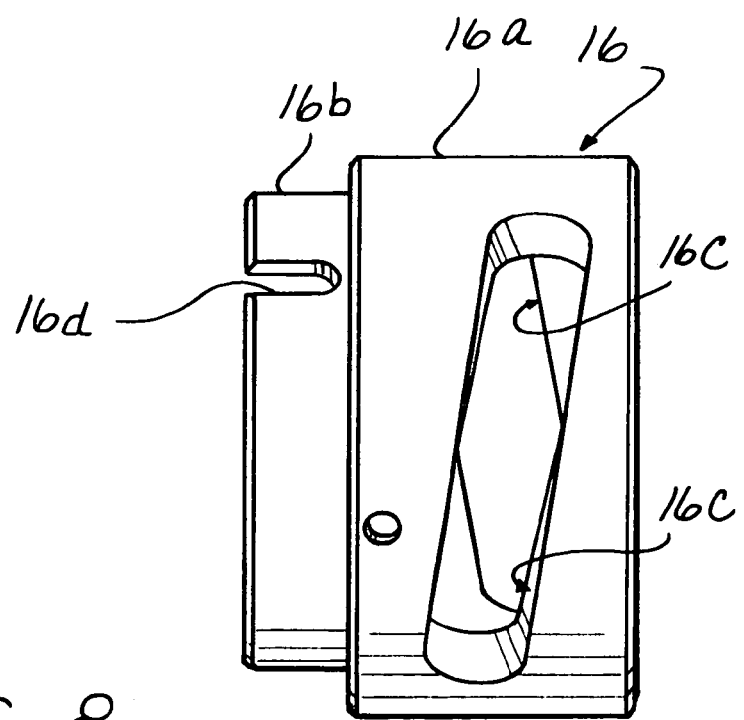
Figure 10:
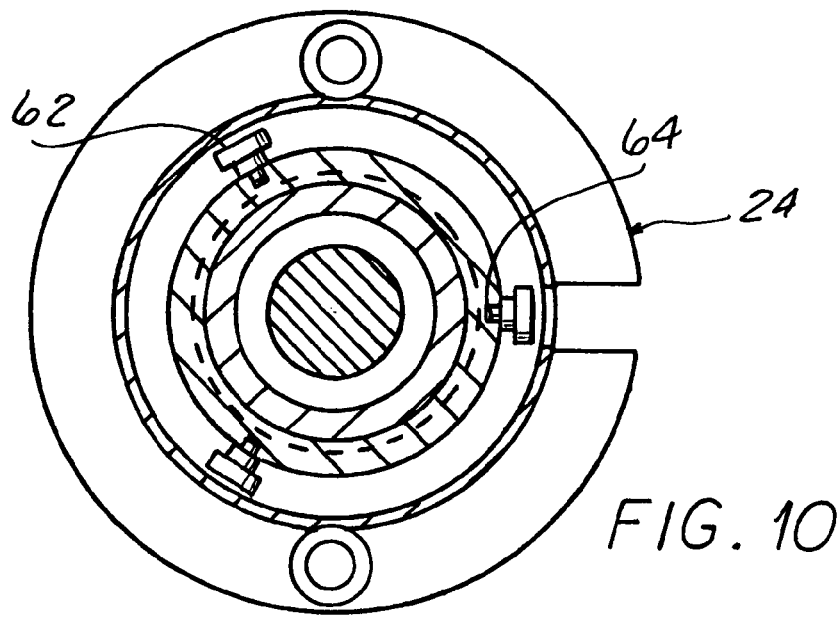
Figure 11:
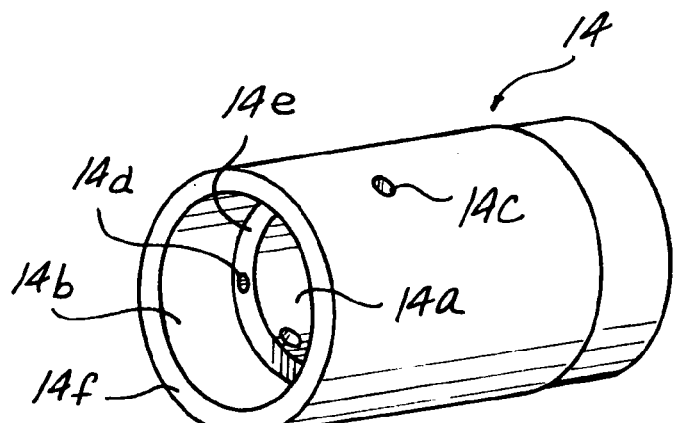
Figure 12:
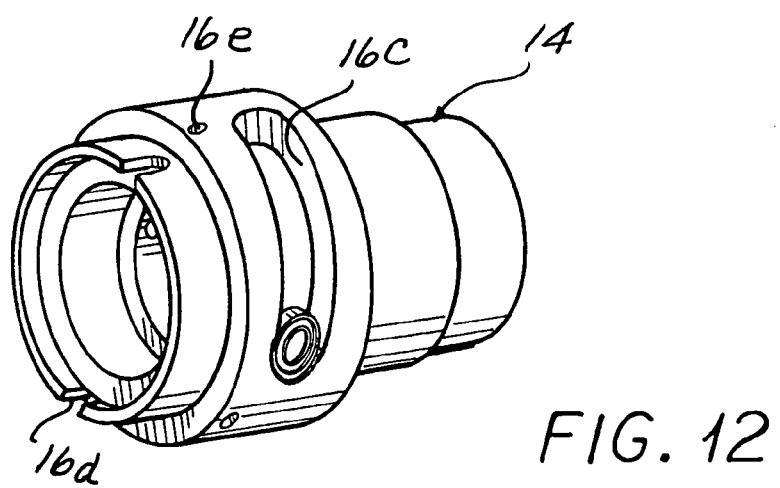

The variable speed transmission 10 of the embodiment of FIGS. 1-12, broadly considered, includes a frame or foundation 12; an input shaft 14; an actuator sleeve 16; an input hub 18; a coil spring 20; an input ring gear 22; an actuator plate 24; axle shafts 26 and 28; an input pinion gear 30; an input pulley 32 including a primary sheave 34 and a secondary sheave 36; an output pulley 38 including a primary sheave 40 and a secondary sheave 42; a belt 44; a output pinion gear 46; an output hub 48; and an output ring gear 50.

Frame or foundation 12 includes a pair of axially spaced circular disc portions 12a and 12b, a front shaft portion 12c, a rear shaft portion 12d and a center shaft portion 12e extending between discs 12a and 12b. It will be understood that foundation 12, in use, would be suitably secured to a frame structure of the associated mechanism for which the invention transmission is functioning as the transmission mechanism.

Input shaft 14 has an annular or sleeve configuration and is journaled on the forward end 12f of foundation shaft portion 12c via a ball bearing 52. Shaft 14 includes a central bore 14a and a counter bore 14b at the rearward end of the shaft.

Actuator sleeve 16 is positioned around shaft 14 in sliding relation. Sleeve 16 includes a main body forward portion 16a and a rearward flange portion 16b. A pair of diametrically opposed slots 16e are provided in main body portion 16a. Slot 16c are skewed or helical with respect to the central axis 54 of the transmission. A roller bearing 56 is positioned in each slot 16c. Each roller bearing is carried by a pin 58 received in a respective blind bore 14c in the input shaft 14.

Input hub 18 has an annular configuration and is journaled on a hub portion 12g of foundation 12 immediately forwardly of foundation disc portion 12a via a ball bearing 60. The rear annular face 18a of hub 18 is positioned in abutting relation to the front annular face 14F of input shaft 14. A plurality of circumferentially spaced pins 18b on the outer periphery of hub 18 are slidably received in circumferentially spaced rearwardly opening slots 16d in the rear flange portion 16b of actuator sleeve 16.

Coil spring 20 extends between input shaft 14 and input hub 18 and specifically includes main body convolutions 20a in surrounding relation to foundation shaft portion 12c, a front end tail portion 20b received in a blind axial bore 14d in the shoulder 14e interconnecting input shaft bore portion 14a and counterbore 14b, and a rear end tail portion 20c received in a blind axial bore 18c in the front annular face 18a of input hub 18.

Input ring gear 22 is press fit onto an enlarged rear portion 18d of input hub 18.

Actuator plate 24 has a circular configuration and is positioned in surrounding relation to actuator sleeve 16. Plate 24 includes an outer annular main body portion 24a and a central hub portion 24b defining a continuous, circumferential, radially inwardly opening groove 24c. A plurality of roller bearings 62 are positioned at circumferentially spaced locations within groove 24c and each includes a radially inwardly extending pin 64 received in respective circumferentially spaced blind radial bores 16e in actuator sleeve main body portion 16a.

Axle shafts 26, 28 extend rearwardly from actuator plate 24 in diametrically opposed relation. Specifically, the front end 26a of axle shaft 26 is received in a ball bearing 64 mounted in a bore 24d in the main body portion 24a of actuator plate 24 extends rearwardly therefrom through an aperture 12K in foundation disc portion 12a, and extends further rearwardly for slidable receipt at its rear end 26b in a bushing 66 received in a bearing 68 mounted in an aperture 12h in foundation disc 12b. The front end 28a of axle shaft 28 is journaled in a ball bearing 70 mounted in an aperture 24e in actuator plate main body portion 24a, extends rearwardly therefrom through a bushing 72 positioned in a ball bearing 73 mounted in an aperture 12i in foundation disc portion 12a, and extends further rearwardly therefrom for passage at its rear end 28b through an aperture 12j in foundation disc portion 12b.

Input pulley 32, as previously noted, includes a primary sheave 34 and a secondary sheave 36.

Primary sheave 34 is press fit on a portion 26c of axle shaft 26.

Secondary sheave 36 is positioned in surrounding relation to axle shaft 26 with a hub portion 36a received in a ball bearing 74 received in foundation disc portion aperture 12K. Secondary sheave 36 is slidable and rotatable relative to shaft 26.

Input pinion gear 30 is press fit on the forward end 36b of sheave hub portion 36a and is arranged in meshing engagement with input ring gear 22.

Output pulley 38, as previously noted, includes a primary sheave 40 and a secondary sheave 42.

Primary sheave 40 is press fit on a portion 28c of axle shaft 28.

Secondary sheave 42 is positioned in surrounding relation to axle shaft 28 and includes a hub portion 42a received in a bearing 75 positioned in foundation disc portion aperture 12j. Secondary sheave 42 is slidable and rotatable relative to shaft 28.

Belt 44 is trained around pulleys 32 and 38 and specifically is positioned between the angled inboard faces 42b, 40a of sheaves 42 and 40 and between the angled inboard faces 34a, 36b of sheaves 34 and 36.

Output pinion gear 46 is press fit on the rear end 42c of secondary sheave hub portion 42a.

Output hub 48, constituting the output drive shaft for the transmission, is journaled on foundation shaft portion 12d via a ball bearing 76.

Output ring gear 50 is press fit on output hub 48 and is arranged in meshing engagement with output pinion gear 46.

Operation

Input drive or torque is delivered in known manner to input shaft 14 from whence the torque is transferred to actuator sleeve 16 via roller bearings 56 acting in skewed helical grooves 16c from whence the torque is delivered to input hub 18 via pins 18b and slots 16d from whence the torque is delivered to input ring gear 22 from whence the torque is delivered to input pinion gear 30 which drives the secondary sheave 36 of pulley 32 which drives the belt 44 which drives secondary sheave 42 of pulley 38 which drives output pinion 46 which drives output ring gear 50 which drives output hub or shaft 48 whereby the torque and drive delivered to input shaft 14 appears at output hub or shaft 48.

The gear ratio provided by the transmission is determined by the relative axial displacement between sheaves 34/36 and sheaves 42/40 and this in turn is determined by the position of roller bearings 56 in skewed grooves 16c.

Specifically, as the input torque varies in response to increases in the load applied to the transmission via the associated mechanism, each roller bearings 56 moves within the respective slot 16c to an adjusted position within the slot 16c. This movement has the effect of moving sleeve 16 axially and thereby moving actuator plate 24 axially via roller bearing 62. This in turn has the effect of moving primary sheave 34 toward or away from secondary sheave 36 and simultaneously moving secondary sheave 42 away from or toward primary sheave 40.

Specifically, in response to an increased torque requirement of the associated mechanism, actuator plate 24 is moved rearwardly to move axle shafts 26 and 28 rearwardly which has the effect of decreasing the spacing between sheaves 34 and 36 and increasing the spacing between sheaves 42 and 40 so that the belt 44 moves radially outwardly relative to sheaves 34 and 36 and radially inwardly with respect to sheaves 42 and 40 with the result that the gear reduction ratio of the transmission is increased in response to the increased torque loading. Conversely, in response to a decreased torque loading, actuator plate 24 is moved forwardly whereby to move the axle shafts 26, 28 forwardly whereby to decrease the spacing between the sheaves 42, 40 and increase the spacing between the sheaves 34, 36, whereby to move the belt 44 radially outwardly relative to sheaves 42/40 and radially inwardly relative to sheaves 34/36 whereby to decrease the gear reduction ratio of the transmission in response to the decreased torque loading.

The coil spring 20 acts at all times to provide a biasing force for resisting rotation of input shaft 14 relative to actuator sleeve 16 so that the coil spring in effect acts as a calibration mechanism for the transmission by determining the extent of change in torque loading as compared to the extent of movement of the roller bearings 56 in the slot 16c. The torsion rating rating of the spring therefore determines the sensitivity of the transmission to torque variations and determines the extent to which the drive ratio of the transmission will be varied in response to a given variation in torque loading.

Figure 13:
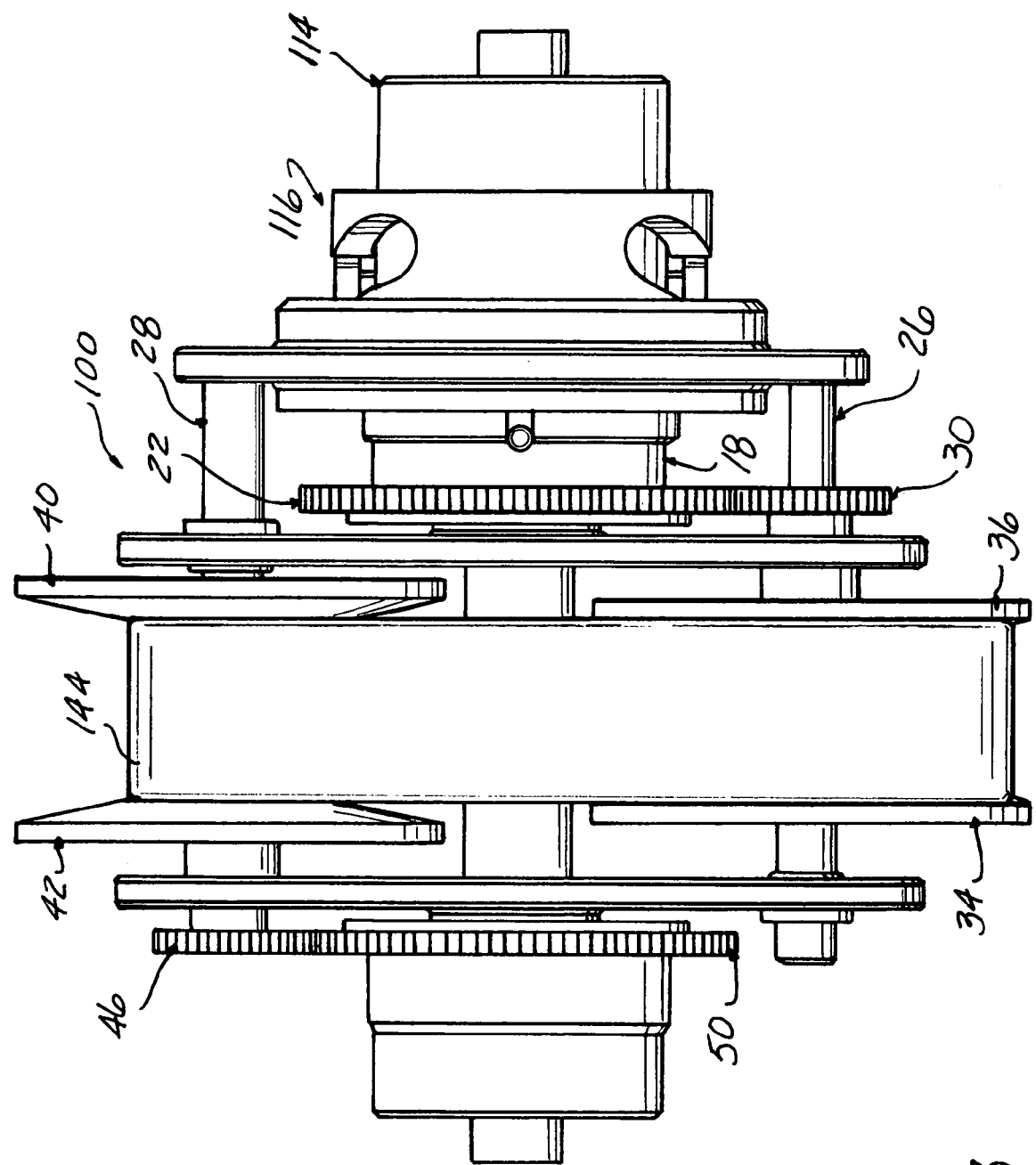
FIG. 13 is a side elevational view of a second embodiment of the invention variable speed transmission.
Figure 14:
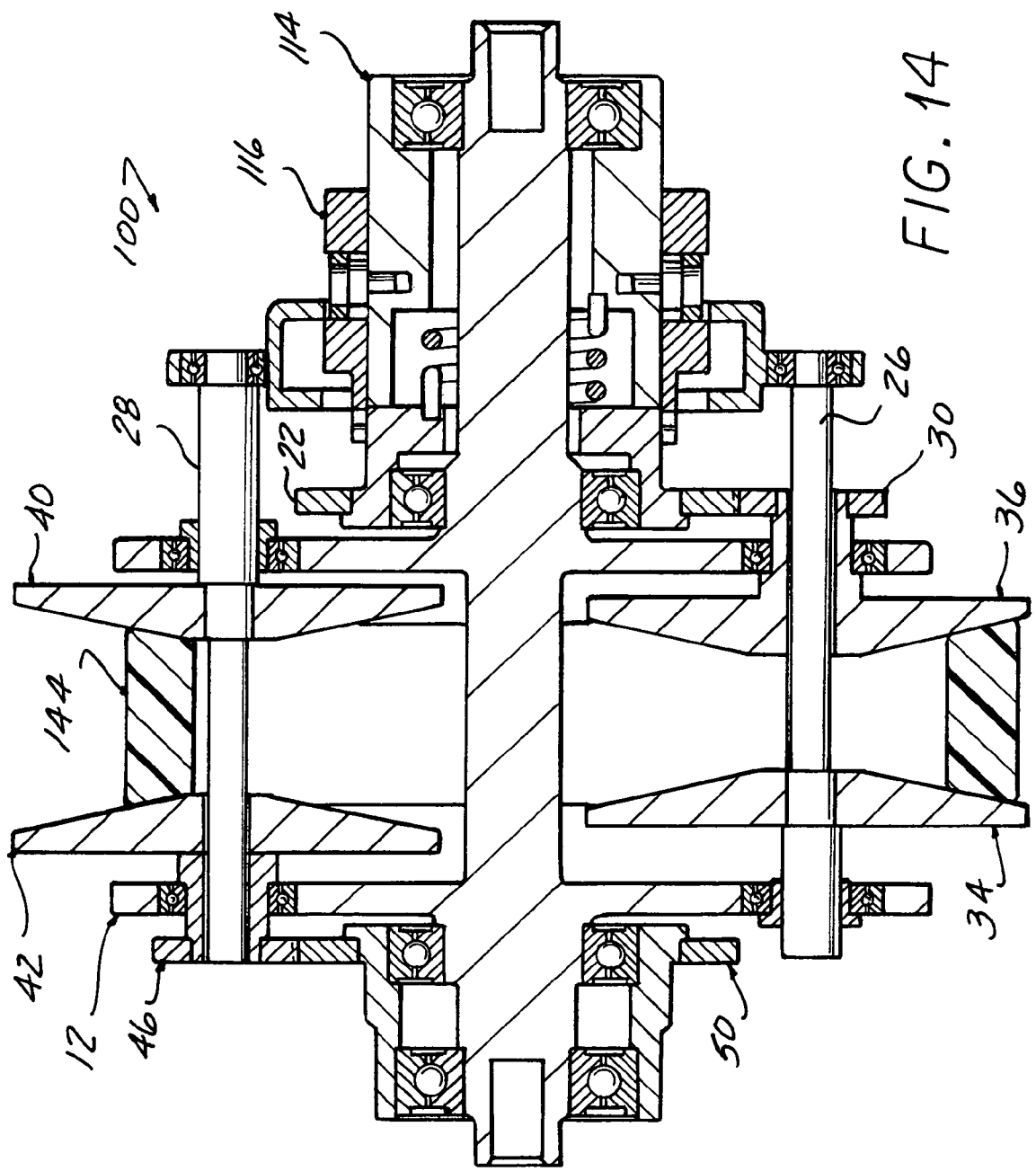
FIG. 14 is a cross-sectional view of the transmission of FIG. 13.
Figure 15:
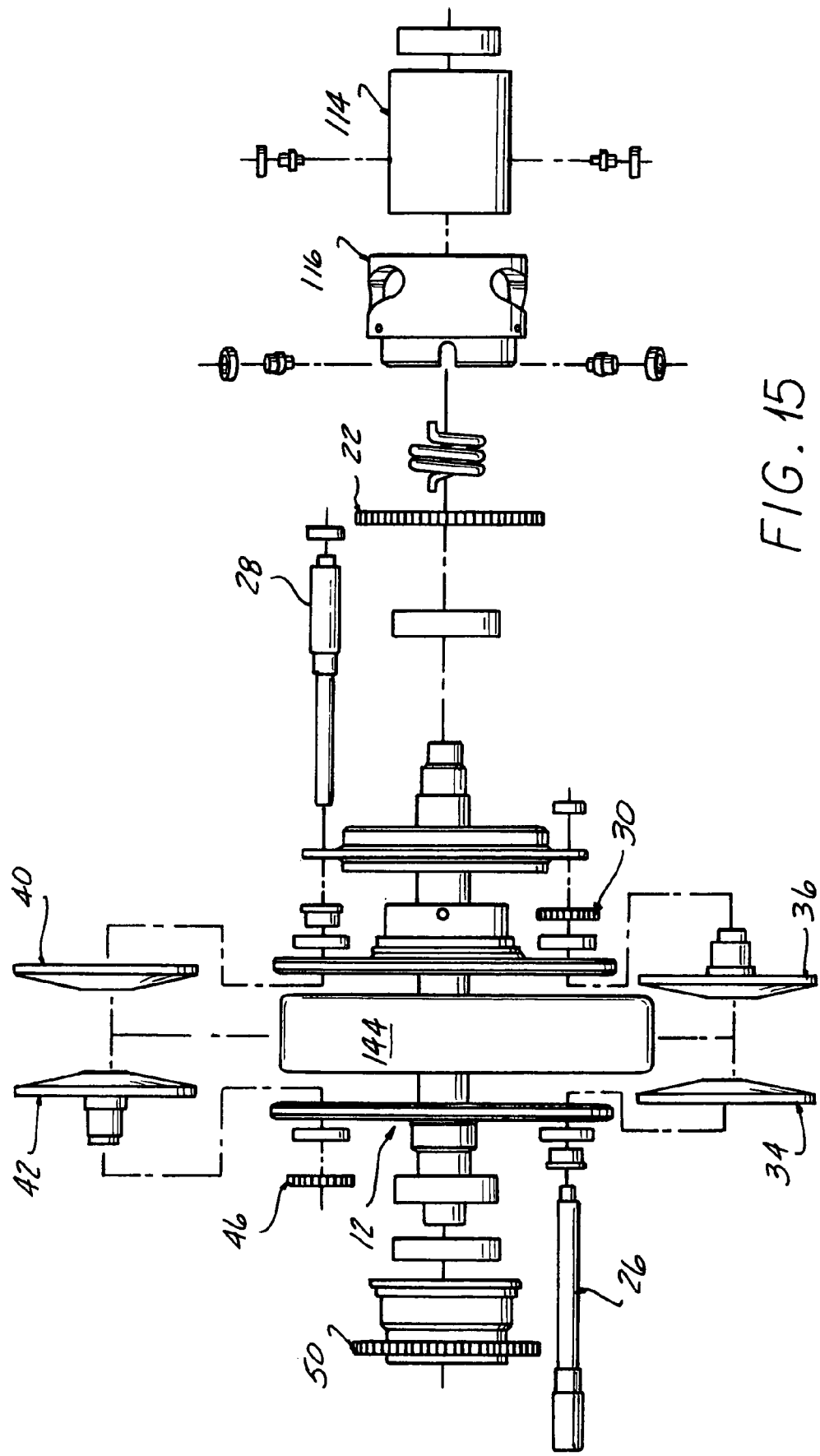
FIG. 15 is an exploded side elevational view of the transmission of FIG. 13.
Figure 16:
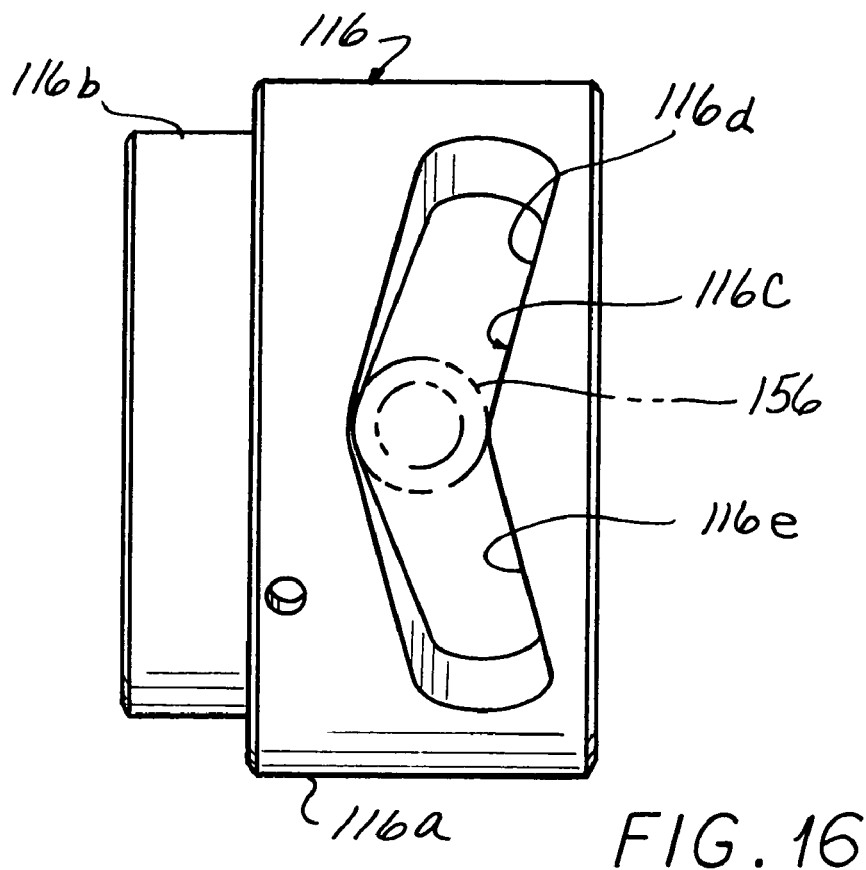
FIGS. 16 and 17 are detail views of elements employed in the transmission of FIG. 13.
Figure 17:
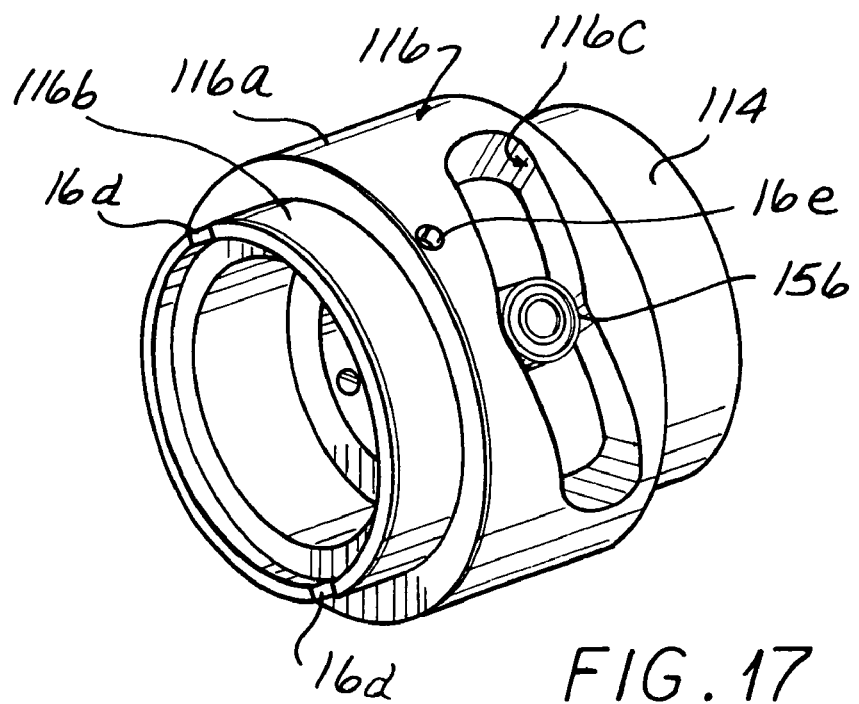

The second embodiment of the invention variable speed transmission seen at 100 in FIGS. 13-17 is generally similar to the transmission of the FIGS. 1-12 embodiment with the exception that the belt 144, rather than having a round cross-sectional configuration, has a V-shaped cross-sectional configuration and each of the grooves 11 6c in the actuator sleeve 116 has a compound configuration including a forward drive portion 11 6d and a reverse drive portion 116e. The transmission of the second embodiment is therefore useable in association with a mechanism having a forward drive mode and a rearward drive mode with the forward drive mode accommodated by the slot portions 16d and the rearward drive mode accommodated by the slot portions 16e.

The variable speed transmission of the invention will be seen to have several important advantages as compared to prior art variable speed transmissions. Specifically, since the spacing between the sheaves of the driving pulley and the spacing between the sheaves of the driven pulley are both positively adjusted in response to torque loading variations the transmission operates to provide a positive adjustment of the transmission gear ratio in response to each incremental change in the torque loading requirements. Further, the described positive adjustment of both the input and the out put pulleys renders the transmission extremely sensitive to even very minor changes in the torque loading requirement and also enables the transmission to operate effectively in scenarios involving relatively small torque loads.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A variable speed transmission comprising:
a first pulley rotatable about a first axis of rotation and having a primary sheave and a secondary sheave positioned adjacent the primary sheave, the primary sheave movable axially along a path of travel defined by the first axis of rotation;
a second pulley rotatable about a second axis of rotation parallel to the first axis of rotation and having a primary sheave and a secondary sheave positioned adjacent the primary sheave of the secondary pulley, the primary sheave of the second pulley movable along a path of travel defined by the second axis of rotation parallel to the first axis of rotation;
an actuator plate movable along a path of travel parallel to at least one of the first and second axes of rotation, the actuator plate drivingly connected to the primary sheave of the first pulley and the primary sheave of the second pulley for concurrent axial movement of the actuator plate and the primary sheaves of the first and second pulleys in a single direction, the actuator plate being movable independently of the secondary sheave of the first pulley and the secondary sheave of the second pulley;
an actuator member rotatably connected to the actuator plate and fixed for concurrent axial movement therewith, the actuator member being positioned at a substantially constant predetermined distance from the primary sheave of the first pulley and the primary sheave of the second pulley; and an input shaft slidably and rotatably engageable with the actuator member, the input shaft being positioned at a substantially constant predetermined distance from the secondary sheave of the first pulley and the secondary sheave of the second pulley, wherein the actuator member includes a helical slot, and the transmission further includes connecting means fixedly attached to the input shaft and engageable with the helical slot of the actuator member whereby rotation of the input shaft relative to the actuator member causes a corresponding axial shift of the actuator member relative to the input shaft.

2. The transmission of claim 1, wherein the actuator plate includes an interior surface defining a circular opening for receiving the actuator member, the interior surface further defining a continuous uninterrupted groove extending circumferentially along an inner perimeter of the opening, the transmission further including a plurality of circumferentially spaced pins mounted on the actuator member and received in the circumferential groove.

3. A variable speed transmission including input and output pulleys each including relatively axially moveable primary and secondary sheaves, and a belt trained around each of the pulleys and operative to drive the output pulley from the input pulley at a ratio that is a function of the axial spacing between the sheaves of the respective pulleys, characterized in that:

the transmission includes an actuator mechanism responsive to the torque being transmitted through the transmission and operative in response to sensed variations in the transmitted torque to positively drive the sheaves of one pulley apart while simultaneously positively driving the sheaves of the other pulley together, the actuator mechanism includes an axially moveable actuator member;

the sheaves of the input pulley are mounted on an input shaft with one sheave axially moveable with the input shaft and the other sheave slidably mounted on the input shaft and precluded from axial movement with the input shaft;

the sheaves of the other pulley are mounted on an output shaft with one sheave axially moveable with the output shaft and the other sheave slidably mounted on the output shaft and precluded from axial movement with the output shaft;

the input and output shafts are respectively mounted on spaced parallel axes and are connected to the actuator member;

the axially moveable sheave of one of the pulleys is mounted on a respective one of the input and output shafts between the actuator member and the slidably mounted sheave; and the axially moveable sheave of the other pulley is mounted on another of the input and output shafts with the slidably mounted sheave positioned between the axially moveable sheave and the actuator member, whereby axial movement of the actuator member in a given direction moves the sheaves of one of the pulleys apart and simultaneously moves the sheaves of the other pulley together;

wherein the input shaft and output shaft having a coincident central axis;

the input and output shafts are positioned on opposite sides of the central axis;

the actuator member comprises an annular actuator plate positioned in surrounding relation to the central axis; and the input and output shafts are mounted to the actuator plate at diametrically opposed locations on the plate.

4. A transmission according to claim 3 wherein:

the actuator mechanism further includes a sleeve positioned around the transmission input shaft and including a slot that is skewed with respect to the central axis;

the transmission input shaft includes a drive pin positioned in the skewed slot whereby the transmission input shaft may drive the sleeve and may move along the slot in response to variations in the sensed torque with consequent axial movement of the sleeve relative to the transmission input shaft; and the actuator plate is drivingly connected to the sleeve in a manner such that the plate moves axially with the sleeve but the sleeve is free to rotate relative to the plate.

5. A transmission according to claim 4 wherein the driving connection between the plate and the sleeve comprises a circumferentially radially inwardly opening groove on an inner periphery of the plate and a pin mounted on the sleeve and received in the groove.

6. A variable speed transmission according to claim 5 wherein:

the first and second sheaves of the first pulley are mounted on a first shaft;

the first and second sheaves of the second pulley are mounted on a second shaft parallel to the first shaft;

the torque sensing mechanism includes an actuator member that is moveable axially in response to variations in the sensed torque;

the first and second shafts are connected to the actuator member and move axially with the actuator member;

the sheave of the first pulley remote from the actuator member is axially moveable with the first shaft and the other sheave of the first pulley is axially moveable relative to the first shaft; and the sheave of the second pulley closest to the actuator member is axially moveable with the second shaft and the other sheave of the second pulley is axially moveable relative to the second shaft.

7. A variable speed transmission according to claim 6 wherein:

the first and second shafts are positioned at opposite sides of and parallel to a central transmission axis;

the actuator member comprises an annular actuator plate centered on the central axis;

the torque sensing mechanism further includes an actuator sleeve centered on the central axis and positioned within a central aperture of the annular actuator plate, and a plurality of pins on the sleeve received in a continuous circumferential groove defined at the central aperture of the annular actuator plate;

the actuator sleeve is mounted in surrounding relation to the input shaft and includes a slot that is skewed with respect to the central axis; and the input shaft includes a pin received in the slot.

* * * * *